United States Patent
Ries-Mueller

(10) Patent No.: US 6,604,025 B2
(45) Date of Patent: Aug. 5, 2003

(54) METHOD AND DEVICE FOR ASCERTAINING THE LADEN STATE OF A VEHICLE

(75) Inventor: Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/882,553

(22) Filed: Jun. 14, 2001

(65) Prior Publication Data

US 2002/0019685 A1 Feb. 14, 2002

(30) Foreign Application Priority Data

Jun. 14, 2000 (DE) ............................... 100 29 282

(51) Int. Cl.$^7$ ................................ G06F 7/00
(52) U.S. Cl. ........................................... 701/1
(58) Field of Search ................. 701/1, 29, 36, 701/37, 38; 73/146.2

(56) References Cited

U.S. PATENT DOCUMENTS

| | | | | |
|---|---|---|---|---|
| 4,761,991 A | * | 8/1988 | Fembrock | 73/11 |
| 5,081,443 A | | 1/1992 | Breit | 340/426 |
| 6,034,596 A | | 3/2000 | Smith et al. | 340/447 |
| 6,151,537 A | * | 11/2000 | Gheordunescu et al. | 701/1 |

FOREIGN PATENT DOCUMENTS

| | | | |
|---|---|---|---|
| DE | 38 15 114 | 11/1989 | |
| DE | 38 41 992 | 6/1990 | |
| DE | 41 08 337 | 7/1992 | |
| EP | 0 333 708 | 9/1989 | |
| JP | 10267739 | 9/1998 | G01G/19/10 |
| WO | WO 01/86239 | 11/2001 | G01F/19/08 |

* cited by examiner

*Primary Examiner*—Yonel Beaulieu
(74) *Attorney, Agent, or Firm*—Kenyon & Kenyon

(57) ABSTRACT

A method for ascertaining the laden state of a vehicle, particularly a motor vehicle, the pressure in at least one tire of the vehicle being measured, and the laden state being ascertained in view of the measured tire pressure.

17 Claims, 4 Drawing Sheets

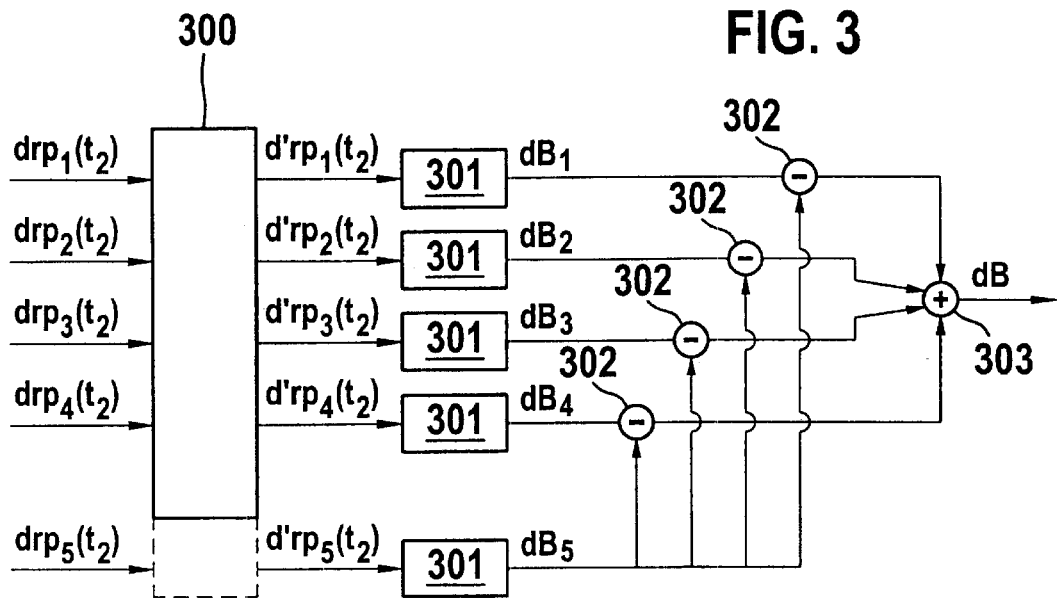
FIG. 3
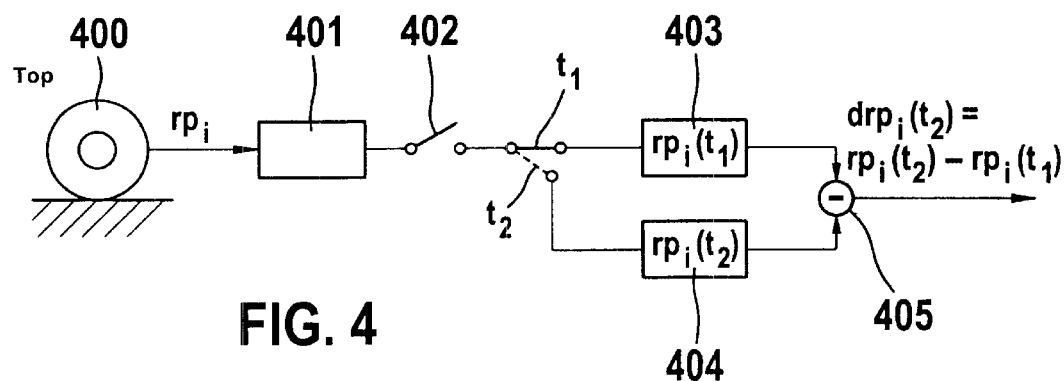
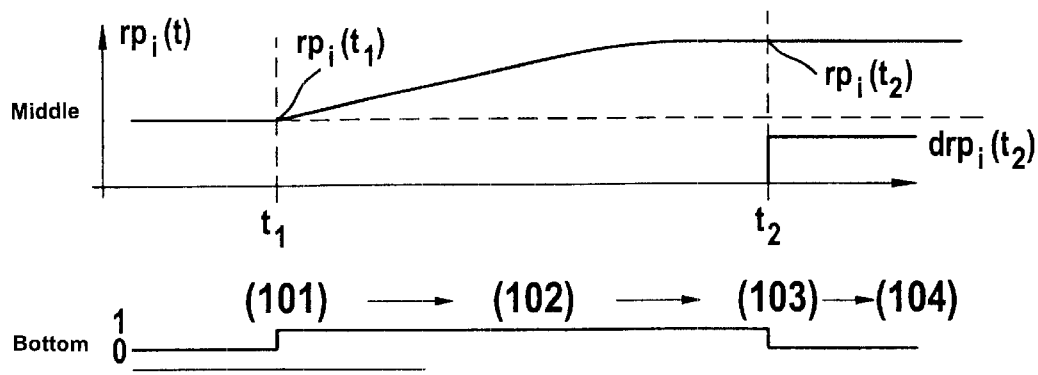
FIG. 4

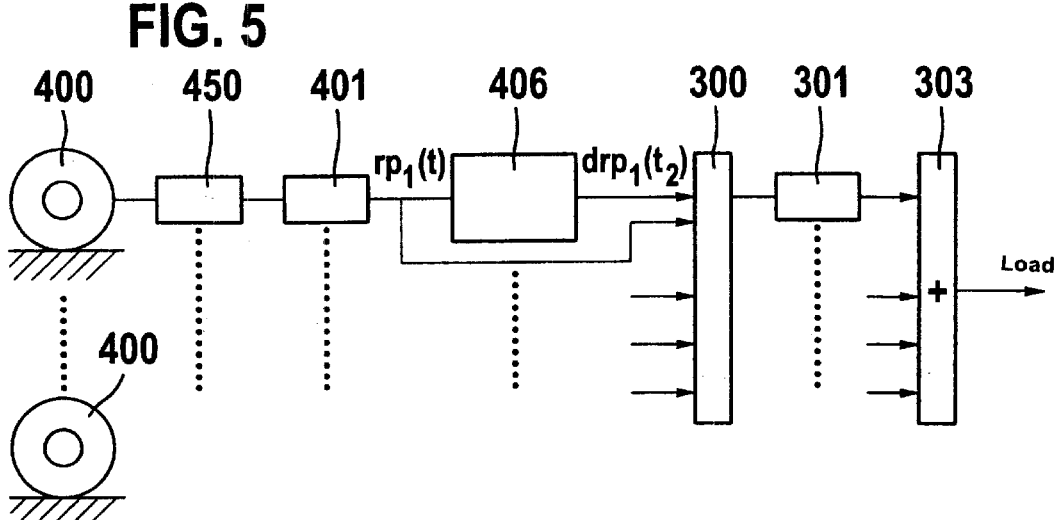
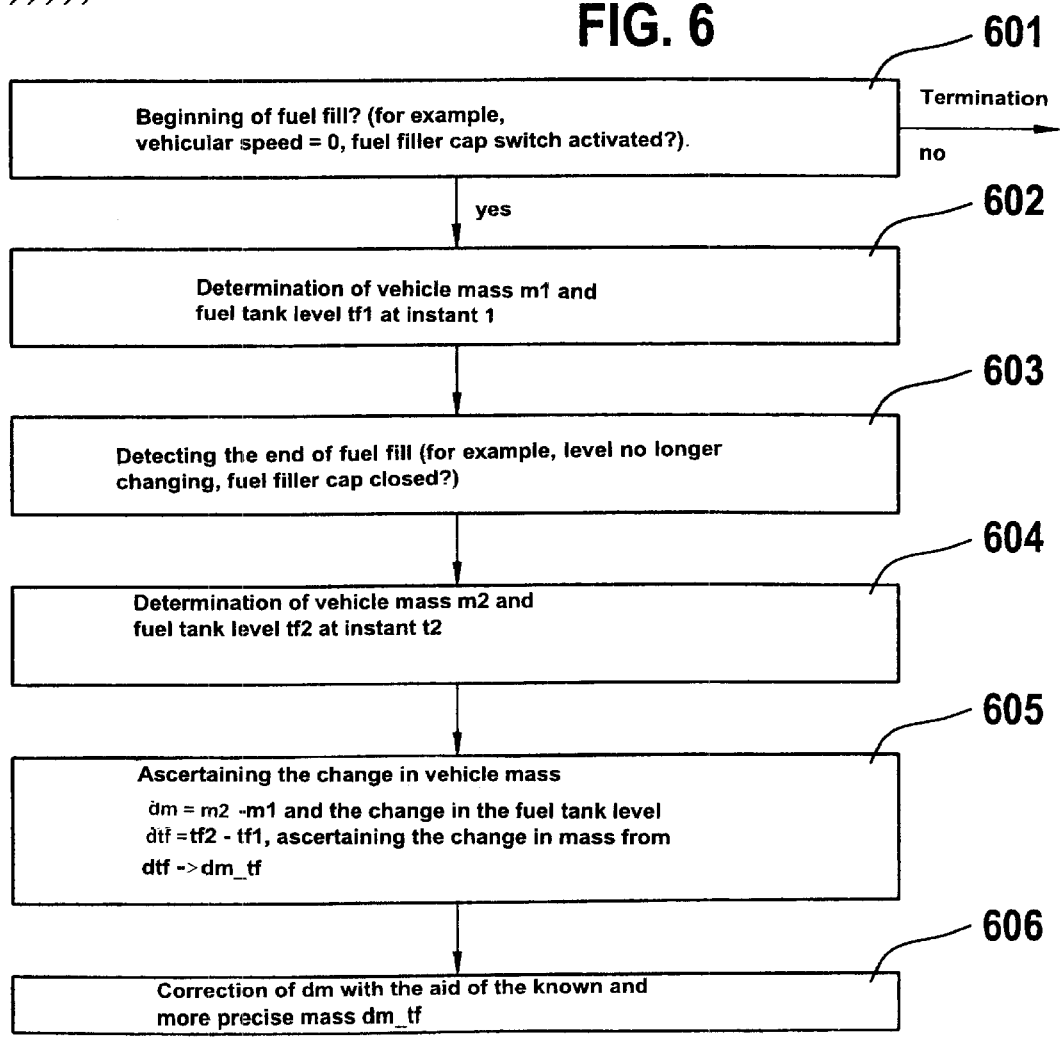

METHOD AND DEVICE FOR ASCERTAINING THE LADEN STATE OF A VEHICLE

FIELD OF THE INVENTION

The present invention relates to a method and a device for ascertaining the laden state of a vehicle, particularly a motor vehicle.

BACKGROUND INFORMATION

Systems are known for monitoring the tire pressure in motor vehicles. For example, German Patent No. 41 08 337 describes a device for monitoring the pressure in pneumatic tires. This device is used for monitoring the pressure in pneumatic tires of wheels on vehicles fitted with an ABS braking system, having a toothed ring that is connected in a torsionally rigid manner to a mounting flange for the respective wheel, as well as a rotary pulse generator, which does not rotate with the wheel, mounted adjacent to the path of motion of the teeth on a part of the wheel suspension for the respective wheel. Provision is made for a pressure sensor, arranged in a stationary manner relative to the toothed ring, having an actuator whose axial position is a function of the pressure in the pneumatic-tire, and to which the rotary pulse generator reacts.

European Patent No. 0 333 708 describes a tire-pressure sensor for motor vehicles having a pressure-operated switch that is to be secured at the periphery of a wheel rim, is to be actuated by the air pressure in the tire, and which, for monitoring the tire pressure, has a reference pressure chamber whose reference volume, which is closed in a pressure-tight manner, is filled with a gas and is sealed off from the tire by an electroconductive membrane; and having a contact pin which the middle region of the membrane touches for closing a current circuit of the sensor when there is sufficient air pressure in the tire. German Published Patent Application No. 38 15 114 describes a device for transmitting and evaluating measuring signals for the tire pressure of motor vehicles. Such a device includes a pressure sensor that is arranged in the rim wall of a wheel and is electrically connected to a signal-generating coil arranged on the rim, as well as a high-frequency oscillating-circuit signal-evaluating arrangement that is rigidly joined to the motor vehicle in the region of the axle and has a signal-receiving coil. Arranged in the region of the signal-generating coil, on the hub supporting the rim and joined in a rotationally-fixed manner to it, is a first transmitter coil which is electrically connected to a second transmitter coil designed as an annular coil whose axis is coincident with the hub axis, and the signal-receiving coil of the stationary high-frequency oscillating-circuit signal-evaluating arrangement being arranged in the magnetic-field region of the second transmitter coil.

Finally, the German Published Patent Application No. 38 41 992 describes a pressure-operated switch for monitoring the pressure in the tire of a motor-vehicle wheel. In such a pressure-operated switch for monitoring the pressure in the tire of a motor-vehicle wheel, in addition to two contact elements, an electrical temperature sensor for monitoring the tire temperature is arranged in a reference pressure chamber of the switch, it being possible for the temperature sensor to be a temperature-sensitive, electrical semiconductor switch.

Knowledge with respect to the laden state of the vehicle is also an advantage for numerous vehicle functions. To be named as vehicle functions in this connection are, for example, the height control of a low beam (here, travel sensors provided on the shock absorber are conventionally used), the design (i.e. the shifting points) of a transmission-shift control (here, for example, one adjustment per adaptation is conventionally carried out), as well as braking interventions, e.g. ABS, brake-assistant or ESP (electronic stability program) systems.

The following should be pointed out in connection with a transmission-shift control, i.e. transmission-shift interventions:

Various characteristic shifting curves are stored for fixed ratio automatic transmissions. Reproduced in these is the speed/load combination at which the transmission shifts. The aim of a shifting program is typically to always make available to the driver a sufficient power reserve for an acceleration, this measure tending to lead to a higher engine speed.

On the other hand, fuel consumption rises because of this, from which it follows that a low engine speed is more desirable for economical reasons. In order to find a better compromise, given these opposite interests, it is possible, for example, for the driver to switch back and forth between different characteristic shifting curves by switch. Alternatively, in modern systems the driver type (sportier or economically oriented) is determined adaptively from the change in the accelerator. If at this point the vehicle load is known, a shift can be made automatically, so to speak, from a first to a second shifting characteristic of the manually shifted transmission in response to a high load, e.g. upon exceeding a pre-definable threshold value. This also has the advantage that the vehicle exhibits the same acceleration performance for the driver, even at high load.

Braking interventions can also be influenced as a function of a vehicle load, so that knowledge about the laden state of the vehicle is an advantage here, as well. Thus, for example, it can be useful to boost the braking intervention by a greater braking pressure at the wheel in response to a high load, accompanied by the same brake-pedal actuation by the driver. This means that, in response to a high load, a higher boost of the driver's braking input is carried out compared to the braking boost at a low load.

Correspondingly, a vehicle with a high load is more in danger of break-away. Therefore, it can be useful to already carry out a stabilizing ESP intervention (i.e. braking intervention) sooner at high load than would be the case at normal load.

Another application for which knowledge about the laden state of the vehicle is an advantage is rollover detection. In the case of rollover detection, an overturn or rollover of the vehicle is predicted as a function of the vehicle dynamics, e.g. the vehicular speed and/or the tipping movement or yawing about the longitudinal vehicle axis, in order to activate certain safety systems such as airbags in time. Here as well, the knowledge of the vehicle load could be used for a more precise prediction of a vehicle overturn.

Finally, reference should be made to the use of active chassis. If such chassis are used, for example, the damping by the shock absorber can be influenced by information with respect to the vehicle load. A change in the vehicle height is also conceivable as a function of the load.

Detection of the laden state of the vehicle is also desirable in view of safety aspects, particularly in connection with maximum permissible loads. Weighing devices are conventionally used for detecting a laden state of a vehicle, which proves to be very costly in practice.

SUMMARY OF THE INVENTION

An object of the present invention is to indicate a simplest possible method for ascertaining the laden state of a vehicle.

The method and device of the present invention now make it possible to ascertain the laden state of a vehicle, particularly a motor vehicle, in a particularly simple and inexpensive manner. For the case when a tire-pressure detection system is provided, according to the method of the present invention, there is no additional hardware expenditure for ascertaining the laden state.

Based on suitable mathematical models, a simple ascertainment of the laden state can be carried out on the basis of a measured tire pressure. In a first approximation, one can start out from the assumption that a change in tire pressure is, let us say, proportional to a change in load. In the case of typically occurring tire pressures and laden states, 500 kg of additional load, for instance, will probably lead to a pressure increase of 500 mbar per tire. Particularly advantageously usable mathematical models are explained below by way of example in the figure description.

The pressure is expediently measured in all the tires of the vehicle. Particularly precise measuring results are obtainable in a simple manner on the basis of such a measurement.

According to a particularly preferred refinement of the method according to the present invention, the measurement is carried out continuously over a predetermined period of time, the laden state of the vehicle being ascertained in view of a change in the measured tire pressure as a function of time. By suitable assessment of the rate of change of the tire pressure and the changes specific to the individual tires (possibly including the spare wheel), it is possible to differentiate a change in tire pressure caused by a change in the laden state, from other tire-pressure influences such as pumping up the tires or temperature changes. In this connection, it proves to be advantageous to carry out the measurement only when the possibility of a load change is present. For example, the measurement can be started when one of the door locks is actuated. Furthermore, the measurement and evaluation of the tire pressure for a load detection can be stopped, for example, when a predefined vehicular-speed threshold is exceeded. With the aid of a suitable logic, described by way of example below in the figure description, it is possible to assess whether a change in tire pressure has come about on the basis of a load or because of other influences, that is to say, whether the change in tire pressure should be taken into account for the load. For example, if the pressure of only one tire changes, then this is not taken into account for the measurement. For a load change, the wheel pressure advisably changes in the case of more than one tire, depending on the vehicle geometry.

The tire temperature and/or the ambient pressure and/or the ambient temperature are advantageously taken into account for ascertaining an absolute load of the vehicle. Ambient pressure or ambient temperature and the tire temperature are derivable, for example, from generally known signals of an engine management system.

It proves to be particularly advantageous to monitor the vehicle for rollover on the basis of the measured tire pressure. For example, vehicle rollover detection is significant for an airbag triggering (crash detection). Such a rollover can be ascertained in a simple manner on the basis of the tire pressure, since during a rollover, the load is suddenly removed from the tires, thus leading to a corresponding pressure reduction.

According to a further, particularly preferred specific embodiment of the method according to the present invention, for which protection is requested separately, a previously known or calculable change in vehicle mass is determined and evaluated within the framework of ascertaining the laden state. For example, with the use of suitable mass sensors, this measure makes it possible to infer the total vehicle mass, i.e. the laden state of a vehicle, from a change in mass, and/or to obtain such information with greater accuracy. This measure is usable particularly in addition to the consideration of the tire pressure according to the present invention.

A change in mass is advantageously calculated by measuring the mass of a fuel quantity supplied to a vehicle fuel tank. If, for example, the tank level is determined prior to and after a fuel fill, it is possible to draw a conclusion about the supplied fuel mass from this information.

According to a further preferred specific embodiment of the method according to the present invention, it is likewise possible to use the known mass of a vehicle driver or another person as the change in mass.

It is particularly preferred that the determined change in mass be used for calibrating a laden state of the vehicle ascertained on the basis of the measured tire pressures. In this context, for example, it is conceivable to calibrate suitable mass sensors of the vehicle. If, for example, the ideal or theoretical characteristic curve of such a mass sensor differs from its actual characteristic curve, a calibration of the mass sensor is possible in a simple manner on the basis of a known change in mass.

It is likewise advantageously possible to use the tire pressure of the reserve wheel to compensate for environmental influences on the tire pressures of the tires in use. For example, temperature influences can easily be calculated with these means.

According to further preferred specific embodiments of the method according to the present invention, an ascertained laden state is used for a headlight leveling control and/or a transmission-shift control and/or an ABS control and/or for the support of a brake assistant and/or for the support of ESP control units and/or within the framework of an active chassis influencing.

Furthermore, the tire-pressure changes of the individual tires are expediently placed in logical relationship to one another, and specifically in such a way that only tire-pressure changes relevant for a load are taken into account.

BRIEF DESCRIPTION OF THE DRAWINGS

FIG. 3 shows a diagram for presenting a further refinement of the method according to the present invention.

FIG. 4 shows a diagram in particular for the schematic representation of the components of a preferred specific embodiment of the device according to the present invention.

FIG. 5 shows a further diagram for the schematic representation of the components of a preferred specific embodiment of the device according to the present invention.

FIG. 6 shows a flowchart for representing a further preferred refinement of the method according to the present invention.

DETAILED DESCRIPTION

According to the preferred described embodiment of the method according to the present invention, in a step 101, it is first determined whether favorable measuring conditions exist. For example, a state in which the vehicle is standing (vehicular speed=0) can be regarded as a favorable measuring condition. Furthermore, after an actuation of one of the door locks, for example, it can be assumed that favorable measuring conditions exist.

Given the presence of favorable measuring conditions, beginning with an instant $t_1$ and ending with an instant $t_2$, an in particular continuous measurement of tire pressure rp1, rp2, rp3, rp4 in the respective tires is carried out in a step 102. The respective tire pressure at instants $t_1$ and $t_2$ is stored. It would likewise be conceivable to determine the tire pressures only at instants $t_1$ and $t_2$. In this context, it is also conceivable to determine tire pressure rp5 in a reserve wheel. Based on the acquisition of this tire pressure rp5, it is possible to eliminate environmental influences such as temperature influences.

In a step 103, it is subsequently determined whether a change in at least one tire pressure $drp_1$, $drp_2$, $drp_3$, $drp_4$ between instants $t_1$ and $t_2$ is greater than a specifiable threshold value. In this context, tire-pressure changes $drp_1$, $drp_2$, $drp_3$ and $drp_4$, (designated hereinbelow as $drp_i$, i=1–4) can be determined in particular using subtraction of the form $drp_i(t_2)=rp_i(t_2)-rp_i(t_1)$. For example, an absolute pressure value, or even a derivation of a pressure value according to the time, is usable as a threshold value. Furthermore, an overall view of such values in any way desired can be used as a complex total threshold value.

Finally, the laden state or a change in the laden state is ascertainable in a step 104 on the basis of the changes in tire pressure.

Steps 101 through 104 can be repeated at any time intervals. For example, it is also possible to monitor the wheel pressures in the manner described even while driving (vehicular speed>0), to thus also be able to detect a rollover of the vehicle, for instance.

The tire pressure can be measured in particular with systems as are known from the related art and as were described in the introductory part of the specification. The ascertainment according to the present invention of the laden state or of a change in load of the vehicle is possible using a controller (not shown in detail), which, for example, can be integrated into an engine management system that is known per se.

Figure 2:
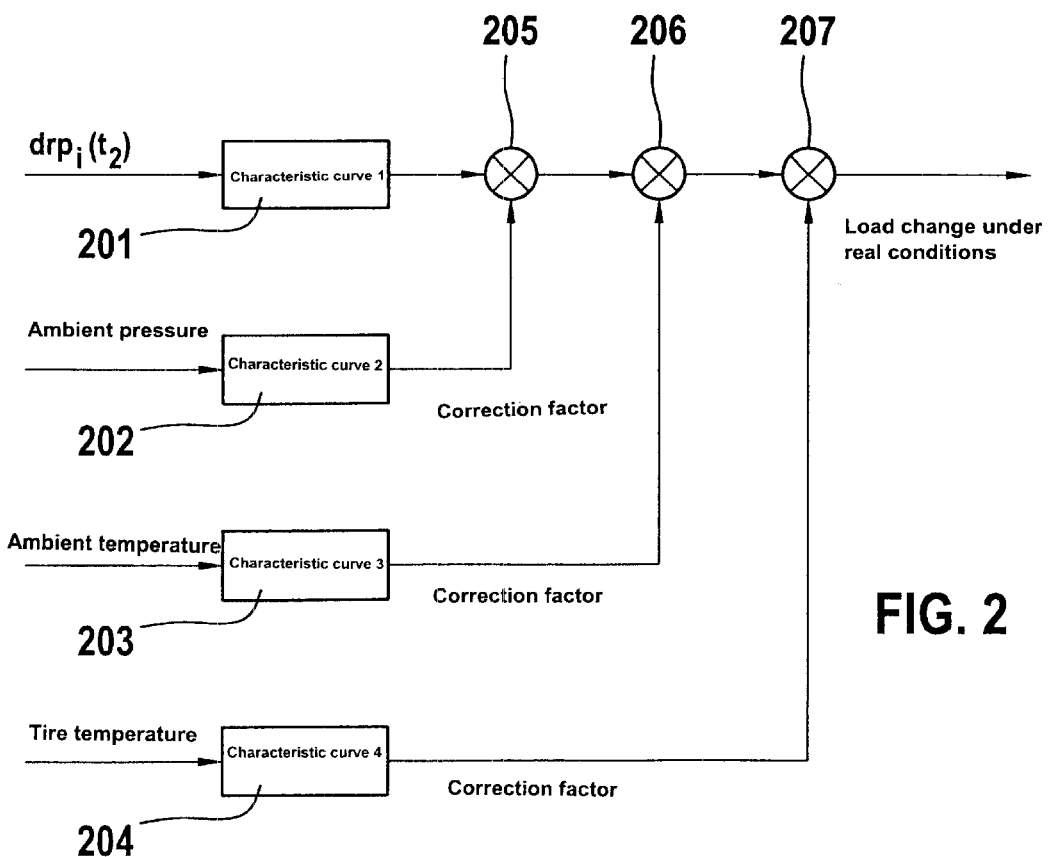
FIG. 2 shows a diagram for clarifying a simple mathematical model for carrying out the method of the present invention.

A simple mathematical model for implementing the method of the present invention shall now be explained with reference to FIG. 2. One can see that tire-pressure changes $drp_i(t_2)$ are compared to a corresponding load/tire-pressure characteristic curve (step 201). In this context, this characteristic curve describes a load change under standard conditions, for example, an atmospheric pressure of 1013 mbar and an ambient temperature and/or a tire temperature of 20° C. A second characteristic curve taking into account the ambient pressure or atmospheric pressure, a third characteristic curve taking into account the actual ambient temperature, and a fourth characteristic curve taking into account an actual tire temperature are usable as correction factors. Pressure models and/or temperature models are also usable in this connection. The characteristic curves indicated are specified in steps 202, 203, 204. These characteristic curves are linked to first characteristic curve 201 (e.g. with the aid of summing elements 205, 206, 207), thereby yielding an estimation or calculation of a load change under real conditions. The model shown makes available a simple mathematical model first of all for one vehicle tire, and thus the load acting on this tire. The characteristic curves mentioned can be ascertained, for example, by approximation per application in the vehicle, and permanently stored in a data memory. To ascertain the total vehicle load, the load change of the individual tires is placed in relationship to one another, in particular, is summed up. This measure is illustrated in FIG. 3. One can see that a load change is ascertained here for each tire (including the reserve wheel). A logic module 300 is used to judge whether a tire-pressure change has come about because of a load, that is to say, whether the tire-pressure change is to be taken into account for the load. If the pressure of one tire changes exclusively, then this is not taken into account. One can recognize that values $drp_1$ through $drp_5$ represent inputs of logic module 300, while modified values with $d'rp_1$ –$d'rp_5$ represent the output signals. It is conceivable, for example, not to use logic module 300 to modify value $drp_5(t_2)$ of the reserve wheel, but rather to leave it essentially unchanged. This possibility is shown by dotted lines. On the basis of these output signals, in steps 301 a model calculation is supplied for calculating respective load changes $dB_1$ through $dB_5$. It can be seen that load change $dB_5$ ascertained for the reserve wheel is subtracted from load-change values $dB_1$ through $dB_4$ with the aid of corresponding subtracting elements 302. Values $dB_1$ through $dB_4$ thus modified are added in a summing element 303 to calculate total load change dB. The compensation of changes in response to ambient conditions, e.g. ambient pressure or temperature, executable by the inclusion of value $dB_5$, is, of course, optional.

Figure 1:
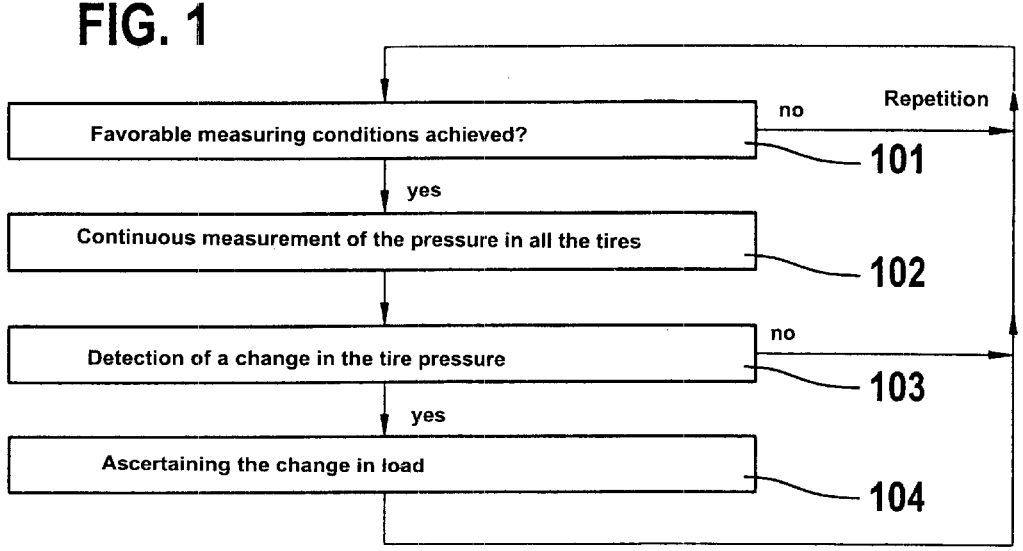
FIG. 1 shows a flowchart for presenting a particularly preferred specific embodiment of the method according to the present invention.

In FIG. 4, top, essential components of the device according to the present invention are shown schematically in simplified form. A tire-pressure measuring signal is detected with respect to a wheel or tire, indicated here by 400, and is supplied to a conditioning stage, e.g. a low-pass filter 401. A switch 402 is used to set whether the measured-value acquisition is active or not. The conditioned measuring signal with respect to instant $t_1$ is stored in a first memory 403, and the conditioned measuring signal with respect to instant $t_2$ is stored in a second memory 404. Differential signal $drp_i(t_2)=rp_i(t_2)-rp_i(t_1)$ is ascertained with the aid of a subtracting element 405. As already mentioned, an actuation of the door lock, for example, is advantageously definable as instant $t_1$. The instant at which the vehicular speed exceeds a specific threshold value, for example, is defined as instant $t_2$. In FIG. 4, middle, the buildup of a tire pressure between instants $t_1$ and $t_2$ is shown for illustration. One can further recognize that value $drp(t_2)$ is available as of instant $t_2$. The measured-value acquisition interval, which, as mentioned, is definable by switch 402, is illustrated in FIG. 4, bottom. Here one can see that a corresponding control signal of switch 402 is switchable back and forth between a low and a high level. In addition, for illustration, the method steps explained with reference to FIG. 1 are marked in corresponding to their occurrence over time.

FIG. 5 shows schematically how the measuring signals from different wheels 400, of which only two are shown for the sake of simplicity, are used for ascertaining the laden state of the vehicle. One can see that the conditioned measuring signals are supplied—optionally with the interconnection of a suitable sequencing-control unit 406—to logic unit 300 already described with reference to FIG. 3. As already described with reference to FIG. 3, the laden state is subsequently calculated in steps 301 and 303. Furthermore, a sensor for detecting tire-pressure measuring signals is designated schematically by 450 in FIG. 5.

A particularly preferred specific embodiment of the method according to the present invention shall now be explained with reference to FIGS. 6 through 9. According to this specific embodiment of the method, to calibrate the method for determining the laden state, the mass of the fuel supplied to the vehicle during a fuel fill is ascertained. To that end, it is first determined in a step 601 whether a fuel fill is taking place, for example, given a vehicular speed of 0 and an actuation of the fuel filler cap switch. If no fuel fill is taking place, the method is broken off and repeated at a later time. On the other hand, if a fuel fill is determined, in a step 602, vehicle mass m1 at the beginning of the fuel fill and fuel-tank level tf1 at this instant t1 are ascertained. In a subsequent step 603, the end of the fuel fill is detected, e.g. by determining that the level is not changing and/or the fuel filler cap is closed. In a subsequent step 604, vehicle mass m2 and fuel-tank level tf2 are determined at this second instant t2. The change in the vehicle mass (dm=m2−m1) and the change in the fuel-tank level (dtf=tf2−tf1) are ascertained in a subsequent step 605. A mass sensor or a suitable method for determining the vehicle mass are expediently used for ascertaining the change in vehicle mass dm. On the other hand, at this point the precise mass of the supplied fuel dm_tf is ascertainable from the change in the fuel-tank level. Vehicle mass dm, ascertained by the mass sensor, can be corrected with the aid of this precisely calculable or known mass dm_tf (see step 606).

Figure 7:
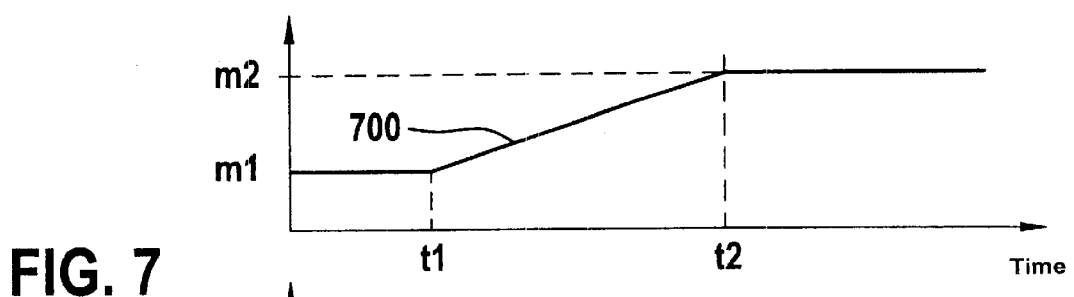
FIG. 7 shows time diagrams for representing the change in mass of a motor vehicle in response to a fuel fill.
Figure 8:
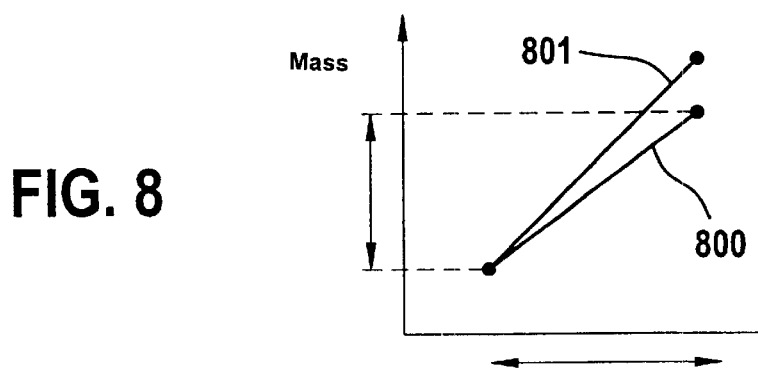
FIG. 8 schematically shows characteristic curves of an ideal and a real sensor for determining the mass of a motor vehicle.

FIG. 7 shows diagrams for representing the time sequence of the change in mass or of the tank-level change with respect to the time (characteristic curves 700 and 701, respectively).

The described method shall be further clarified on the basis of a numerical example: It is assumed that the vehicle mass increases from t1 to t2, for example, actually from 1000 to 1050 kg. In this case, the fuel-tank level increases from 10 to 60 liter; for the sake of simplicity, one liter of fuel would have the mass of 1 kg. Furthermore, a mass sensor is assumed which ideally indicates a change in its voltage output of 1 volt in response to a change in mass of 100 kg. (Instead of a voltage value, it is of course also possible to use a different physical quantity; it is only desirable that a signal be output proportional to the vehicle mass.) A corresponding mass/voltage characteristic curve is designated by 800 in FIG. 8. It is further assumed that the mass sensor has a real characteristic curve, as is indicated at 801, i.e., that the mass sensor in fact only indicates a voltage change of 0.8 V in response to a change in mass of 100 kg. This would then be interpreted as 80 kg, since the characteristic curve of the ideal sensor is used as a baseline. However, if at this point it is known that the mass of the vehicle increases by 50 kg due to a fuel fill, then instead of a voltage change of 0.5 V, the real sensor only supplies a voltage change of 0.4 V. However, the real sensor characteristic 801 can now be adjusted on the basis of the known actual change in mass, i.e., instead of a characteristic curve of 1 V per 100 kg, one now calculates on the basis of 0.8 V per 100 kg.

If it is furthermore assumed that, prior to its calibration, the real sensor allocates an output signal of 8 V to an actual vehicle mass of 1000 kg, on the basis of the conversion using the above sensor characteristic 800, this corresponds to a vehicle mass of only 800 kg. Thus, an error of 200 kg is apparent. This error can also be corrected within the framework of the calibration, that is to say, given suitable sensors, the laden state of the vehicle is possible merely using an appropriately designed mass sensor. In this context, it is possible to dispense with an additional or supplementary ascertainment of the laden state by a tire-pressure measurement, it proving to be advantageous to combine both methods with each other.

Figure 9:
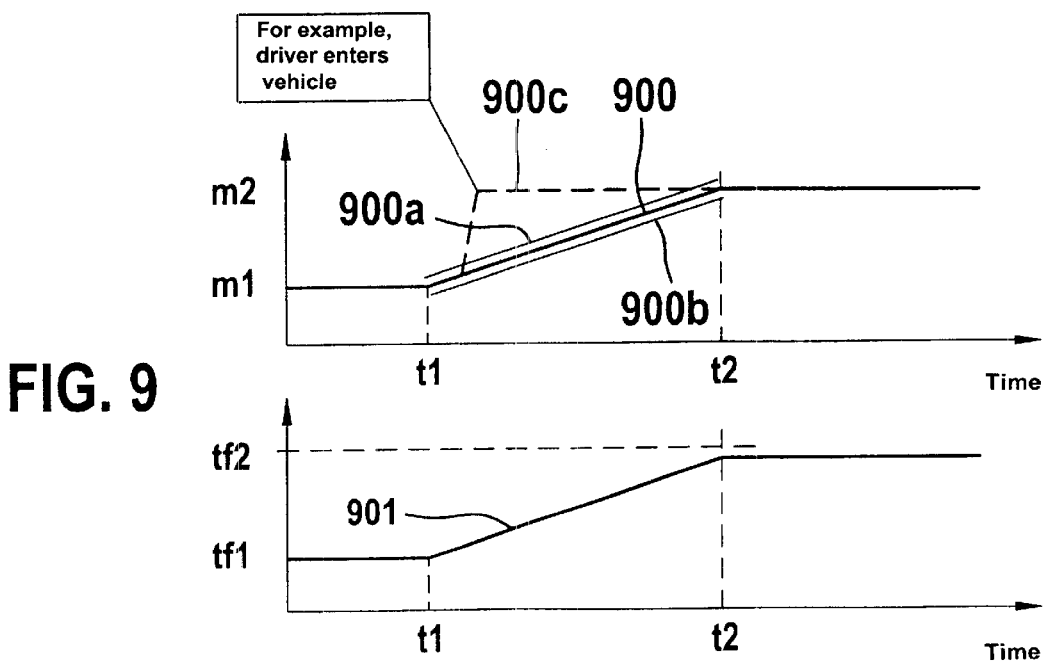
FIG. 9 shows diagrams for presenting a possible differentiation of a fuel fill from other mass-altering influences.

The fuel-fill state can be detected and distinguished from other interference effects (e.g., driver entering the vehicle) by the additional evaluation of the gradient of the change in vehicle mass and the change in the fuel-tank level (see FIG. 7). Possible implementations for distinguishing the fuel fill from other influences shall now be clarified with reference to FIG. 9: In FIG. 9, one recognizes the characteristic curves, already shown in FIG. 7, which are designated here by 900 and 901, respectively. Regarding characteristic curve 900, with knowledge of the change in fuel level, it is possible to preset a tolerance band for a possible change in mass per time. This tolerance band is illustrated by an upper limit 900a and a lower limit 900b. If there is a departure from this band, the ascertainment of mass is broken off. An example for this is shown clearly by line 900c, which results, for example, when a driver gets into the vehicle. It is also conceivable to repeat the described method and the described calibration during a plurality of fuel fills. The result is first used for correcting the ascertainment of mass if a reproducible sensor characteristic can be determined during a plurality of fuel fills.

To more exactly determine the filled-up fuel mass, an approximative temperature correction can additionally be carried out, e.g., in view of the ambient temperature.

As an alternative to the described calculation of the change in vehicle mass in response to a fuel fill, it is also possible—particularly given the presence of a driver-identification system with whose aid the driver is unequivocally recognized, e.g. with the assistance of a smart card—to carry out a calibration in the manner described above on the basis of the known or stored weight of the driver or of another known person.

What is claimed is:

1. A method for ascertaining a laden state of a vehicle, comprising the steps of:

measuring a tire pressure in at least one tire of the vehicle continuously over a predetermined period of time to obtain a change in tire pressure as a function of time; and ascertaining the laden state in view of the change in tire pressure as a function of time.

2. The method according to claim 1, wherein:

the vehicle corresponds to a motor vehicle.

3. The method according to claim 1, wherein:

the step of measuring is performed on each of the at least one tire of the vehicle.

4. The method according to claim 1, further comprising the step of:

ascertaining an absolute load of the vehicle in accordance with at least one of a tire temperature, an ambient pressure, and an ambient temperature.

5. The method according to claim 1, further comprising the step of:

monitoring the vehicle for a rollover in accordance with the measured tire pressure.

6. The method according to claim 1, further comprising the step of:

determining and evaluating one of a known change and a calculable change in a vehicle mass within a framework of ascertaining the laden state.

7. The method according to claim 6, further comprising the step of:

calculating a change in mass by calculating a mass of a fuel quantity supplied to a vehicle fuel tank.

8. The method according to claim 6, wherein:

a known mass of a vehicle driver is used as the change in mass.

9. The method according to claim 6, further comprising the step of:

calibrating the laden state of the vehicle in accordance with the change in mass.

10. The method according to claim 1, further comprising the step of:

compensating for an environmental influence on the tire pressure of each of the at least one tire in use in accordance with a tire pressure of a reserve wheel.

11. The method according to claim 1, wherein the ascertained laden state is used for at least one of:

a headlight-leveling control, a transmission-shift control, an ABS control, a support of a brake assistant, a support of an ESP control unit, and an active influencing of a chassis.

12. The method according to claim 1, further comprising the step of:

placing changes in pressure of individual ones of the at least one tire in a logical relationship to one another in such a way that only tire-pressure changes relevant for a load are taken into account.

13. A device for ascertaining a laden state of a vehicle, comprising:

an arrangement for measuring a pressure in at least one tire of the vehicle over a predetermined period of time to obtain a change in tire pressure as a function of time; and an arrangement for ascertaining the laden state in view of the change in tire pressure as a function of time.

14. The device according to claim 13, wherein:

the vehicle corresponds to a motor vehicle.

15. The device according to claim 13, further comprising:

an arrangement for determining one of a known change and a calculable change in a mass of the vehicle; and an arrangement for ascertaining the laden state in view of the one of the known change and the calculated change in the mass of the vehicle.

16. The device according to claim 15, further comprising:

an arrangement for measuring a mass of a fuel quantity supplied to a vehicle fuel tank.

17. The device according to claim 15, further comprising:

an arrangement for determining that a vehicle driver has entered the vehicle, one of a mass and a weight of the vehicle driver being known to the arrangement for determining.

* * * * *